J. B. Mahana,
Automatic Gate,
N° 45,842. Patented Jan. 10, 1865.
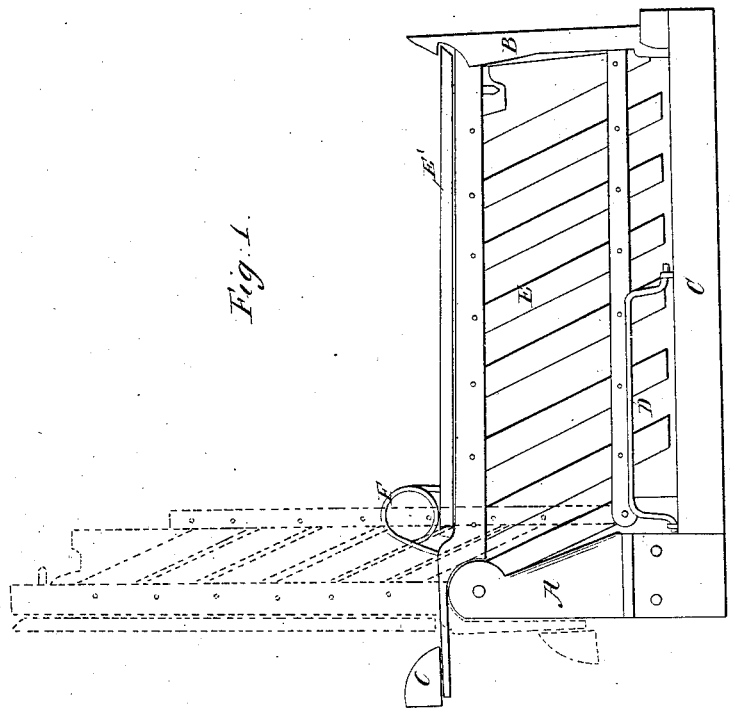
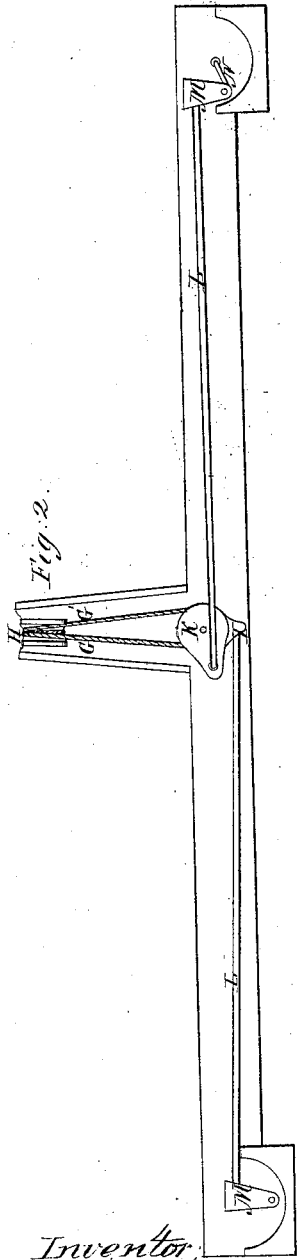
Witnesses;
Edw. S. Brown
Daniel Breed
Inventor,
John B. Mahana

UNITED STATES PATENT OFFICE.

JOHN B. MAHANA, OF BENSON, VERMONT.

AUTOMATIC FOLDING GATE.

Specification forming part of Letters Patent No. 45,842, dated January 10, 1865.

*To all whom it may concern:*

Be it known that I, JOHN B. MAHANA, of Benson, in the county of Rutland and State of Vermont, have invented a new and useful Improvement in Automatic or Folding Gates; and I do hereby declare that the following is a full and exact description thereof, reference being had to the accompanying drawings, and to the letters of reference marked thereon.

My invention consists of a peculiar construction of rising or folding gates, operated by the wheels of a wagon or other vehicle.

In the accompanying drawings, Figure 1 is a side view of my improved gate, the same being shown as folded or elevated in red lines. Fig. 2 is a rear view of the same, the outer board being removed to show the operating devices.

The two gate-posts are seen at A and B. At some distance from these posts a ground-sill, C, is embedded across the wheel-track on each side of the gate. Upon this ground-sill C is arranged a tripper, D, to be struck by the wagon-wheel in passing. The gate is constructed of a bottom and a top bar connected by slats E, so pivoted that the whole gate can be folded, as seen in red lines. At the top of the upper bar of the gate is a sliding piece, E', which serves to latch or fasten the gate. This piece is pushed forward by a spring, F, or by a coiled spring which may be concealed in the upper bar of the gate. This sliding piece E' is drawn back (and the gate thus unlatched) by means of cords G G', running over a pulley, H, Fig. 2. In order to operate these cords I have arranged two eccentrics, I and K, Fig. 2. These eccentrics are connected, by wires L to the arms M, which in turn are connected to the cranks N of the tripper D. Thus, when the wheel strikes the tripper D, the arm M and the eccentric I are moved, operating the cords G G' so as to open or close the gate. These trippers, cords, and other devices for opening and closing the gate are so arranged that a wagon or wheel passing in either direction will open the gate in approaching the same and close the gate in striking the opposite tripper in leaving the gate. A weight, O, is intended to nearly counterbalance the gate and thus facilitate the operation of the trippers above described.

I am aware that rising or folding gates are not new; therefore, I do not broadly claim the invention of folding or automatic gates; neither do I broadly claim the devices herein described, but confine my claims to the peculiar construction herein set forth.

Having thus fully described my invention, what I claim, and desire to secure by Letters Patent of the United States, is—

1. The combination of the folding or rising and falling gate with the trippers D for opening and closing the gate by the action of the wagon (or other) wheel in passing the gate, substantially in the manner and for the purposes set forth.

2. The peculiar arrangement of eccentrics I, wires L, cords G G', and pulley H, for opening and closing the gate, substantially as described.

JOHN B. MAHANA.

Witnesses:
DANIEL BREED,
EDM. F. BROWN.